(12) United States Patent
Sharma et al.

(10) Patent No.: US 11,146,996 B2
(45) Date of Patent: Oct. 12, 2021

(54) COMMUNICATIONS SYSTEM, INFRASTRUCTURE EQUIPMENT, COMMUNICATIONS DEVICE AND METHODS

(71) Applicant: Convida Wireless, LLC, Wilmington, DE (US)

(72) Inventors: Vivek Sharma, Basingstoke (GB); Brian Alexander Martin, Basingstoke (GB); Anders Berggren, Lund (SE); Lars Nord, Lund (SE)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/484,828

(22) PCT Filed: Jan. 19, 2018

(86) PCT No.: PCT/EP2018/051330
§ 371 (c)(1),
(2) Date: Aug. 9, 2019

(87) PCT Pub. No.: WO2018/145879
PCT Pub. Date: Aug. 16, 2018

(65) Prior Publication Data
US 2019/0394685 A1 Dec. 26, 2019

(30) Foreign Application Priority Data

Feb. 10, 2017 (EP) .................................. 17155737

(51) Int. Cl.
*H04W 36/00* (2009.01)
*H04W 76/27* (2018.01)
(Continued)

(52) U.S. Cl.
CPC ....... *H04W 36/0055* (2013.01); *H04W 48/20* (2013.01); *H04W 68/025* (2013.01); *H04W 76/27* (2018.02); *H04W 88/085* (2013.01)

(58) Field of Classification Search
None
See application file for complete search history.

(56) References Cited

U.S. PATENT DOCUMENTS

| 10,277,515 | B2* | 4/2019 | Faccin | H04L 47/805 |
| 2020/0128430 | A1* | 4/2020 | Yi | H04W 28/0268 |
| 2020/0128452 | A1* | 4/2020 | Centonza | H04W 36/0044 |

OTHER PUBLICATIONS

International Search Report and Written Opinion dated Jun. 5, 2018 for PCT/EP2018/051330 filed on Jan. 19, 2018, 16 pages.
(Continued)

*Primary Examiner* — Xavier S Wong
(74) *Attorney, Agent, or Firm* — BakerHostetler

(57) ABSTRACT

A communications system is provided, comprising one or more infrastructure equipment forming part of a wireless communications network, and a communications device. The communications device is configured to transmit or receive signals via a wireless access interface provided by the wireless communications network to or from a peer terminal in the wireless communications network with one or more pre-authorised quality of service, PAQ, flows, at least one of the PAQ flows currently being inactive. One or more of the infrastructure equipment are configured to receive an indication that the communications device is preparing to transmit or receive data with the PAQ flows to or from the one or more of the infrastructure equipment.

19 Claims, 8 Drawing Sheets

(51) Int. Cl.
*H04W 48/20* (2009.01)
*H04W 68/02* (2009.01)
*H04W 88/08* (2009.01)

(56) References Cited

OTHER PUBLICATIONS

Zte et al., "Discussion on the first uplink packet handling in the new QoS architecture", 3GPP TSG-RAN WG2 Meeting # 96, Reno, USA, Nov. 14-18, 2016, R2-167839, 7 pages.
Huawei et al., "UL Traffic Triggered DRB Configuration", 3GPP TSG-RAN2, Meeting # 96, Reno, USA, Nov. 14-18, 2016, R2-167578, 4 Pages.
Nokia et al., "RRC Inactive procedures", 3GPP TSG-RAN WG2 Meeting NR Ad Hoc, Spokane, USA, Jan. 17-19, 2017, R2-1700104, 4 pages.
Holma et al., "LTE for UMTS OFDMA and SC-FDMA Based Radio Access", Wiley 2009, System Architecture Based on 3GPP SAE, 11 pages.
3GPP, "3rd Generation Partnership Project; Technical Specification Group Services and System Aspects; Study on Architecture for Next Generation System", Release 14, 3GPP TR 23.799 V14.0.0, Dec. 2016, pp. 1-522.
3GPP, "3rd Generation Partnership Project; Technical Specification Group Radio Access Network; Evolved Universal Terrestrial Radio Access Network (E-UTRAN); S1 Application Protocol (S1AP)", Release 14, 3GPP TS 36.413 V14.0.0, Sep. 2016, pp. 1-333.
3GPP, 3rd Generation Partnership Project; Technical Specification Group Radio Access Network; Evolved Universal Terrestrial Radio Access Network (E-UTRAN); X2 application protocol (X2AP), Release 13, 3GPP TS 36.423 V13.5.0, Sep. 2016, pp. 1-238.
NTT DOCOMO Inc., "DRB Establishment in Flow based QoS Concept", 3GPP TSG-RAN2#95bis, Oct. 10-14, 2016, Kaohsiung, Taiwan, R2-167110, pp. 1-4.
Intel Corporation, "Pre-authorised QoS in RAN", 3GPP TSG-RAN WG2 Meeting #96 R2-168510, Reno, USA, Nov. 14-18, 2016, 6 pages.
Ericsson (Rapporteur), "TP on QoS and new protocol layer", 3GPP TSG-RAN WG2 #AH Tdoc R2-1700659, Spokane, Washington, USA, Jan. 17-19, 2017, pp. 1-3.
NTT DOCOMO, "New SID Proposal: Study on New Radio Access Technology", 3GPP TSG RAN Meeting #71 RP-160671, Göteborg, Sweden, Mar. 7-10, 2016, 8 pages.
3GPP, "3rd Generation Partnership Project; Technical Specification Group Radio Access Network; Study on New Radio Access Technology; Radio Access Architecture and Interfaces", Release 14, 3GPP TR 38.801 V1.0.0, Dec. 2016, pp. 1-72.
European Communication dated Jul. 17, 2020 in European Application No. 18700595.4.
Huawei et al: "QoS Flow to ORB Mapping", 3GPP Draft; R2-1701205, 3rd Generation Partnership Project (3GPP), vol. RAN WG2, No. Athens, Greece; Feb. 13, 2017-Feb. 17, 2017 Feb. 4, 2017 (Feb. 4, 2017), XP051223422, Retrieved from the Internet: URL:http://www.3gpp.org/ftp/tsg_ran/WG2_RL2/TSGR2_97/Docs/ [retrieved on Feb. 4, 2017].

\* cited by examiner

COMMUNICATIONS SYSTEM, INFRASTRUCTURE EQUIPMENT, COMMUNICATIONS DEVICE AND METHODS

CROSS-REFERENCE TO RELATED APPLICATIONS

The present application is based on PCT filing PCT/EP2018/051330, filed Jan. 19, 2018, which claims priority to EP 17155737.4, filed Feb. 10, 2017, the entire contents of each are incorporated herein by reference.

BACKGROUND

Field of Disclosure

The present disclosure relates to a communications system comprising a communications device and infrastructure equipment, where the communications device is configured with pre-authorised quality of service flows.

The present application claims the Paris Convention priority of European patent application EP17155737, the contents of which are hereby incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficiently connectivity for a wide range of devices associated with different applications with different characteristic data traffic profiles, resulting in different devices having different operating characteristics and/or requirements.

The introduction of new radio access technology (RAT) systems/networks therefore gives rise to new opportunities as well as challenges. One such challenge is how to handle handover and paging procedures when a UE may be configured with one or more pre-authorised quality of service (QoS) flows.

SUMMARY OF THE DISCLOSURE

The present disclosure can help address or mitigate at least some of the issues discussed above.

Embodiments of the present technique provide a communications system comprising one or more infrastructure equipment forming part of a wireless communications network, and a communications device. The communications device is configured to transmit or receive signals via a wireless access interface provided by the wireless communications network to or from a peer terminal in the wireless communications network with one or more pre-authorised quality of service, PAQ, flows, at least one of the PAQ flows currently being inactive. One or more of the infrastructure equipment are configured to receive an indication that the communications device is preparing to transmit or receive data with the PAQ flows to or from the one or more of the infrastructure equipment.

Embodiments of the present technique, which further relate to infrastructure equipment, communications devices, methods of operating communications devices and infrastructure equipment, and circuitry for communications devices and infrastructure equipment, allow for the awareness at a gNodeB of pre-authorised QoS flows at a communications device in scenarios where radio bearers have not yet been set up.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

New Radio Access Technology (5G)

As mentioned above, the embodiments of the present invention can find application with advanced wireless communications systems such as those referred to as 5G or New Radio (NR) Access Technology. It has been proposed to develop a new Radio Access Technology (RAT) for the next generation wireless communication system, i.e. 5G, and in 3GPP a Study Item (SI) on NR has been agreed [1] in order to study and develop the new RAT. The new RAT is expected to operate in a large range of frequencies, from hundreds of MHz to 100 GHz and it is expected to cover a broad range of use cases. The use cases that are considered under this SI include:

Enhanced Mobile Broadband (eMBB)
Massive Machine Type Communications (mMTC)
Ultra Reliable & Low Latency Communications (URLLC)

Figure 1:
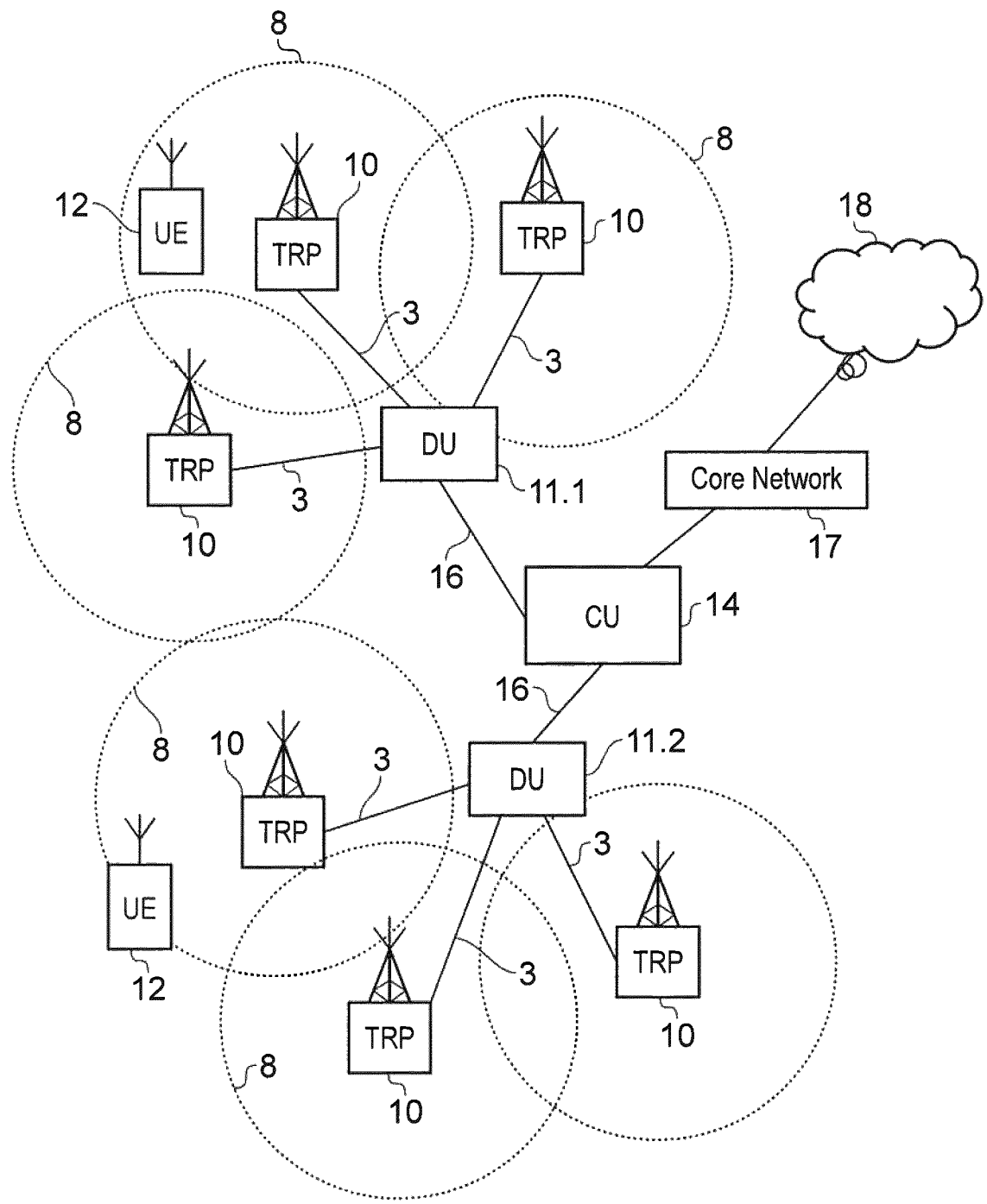
FIG. 1 is a schematic block diagram of a wireless communications system with architectural components corresponding to that of an example enhanced new radio or 5G network.

The aim of 5G is not only mobile connectivity for people, but to provide ubiquitous connectivity for any type of device and any type of application that would benefit from being connected. Many requirements and use-cases are still being discussed, but amongst those are:

Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars)
Low device cost and energy consumption
Flexible spectrum usage Flexible mobility An example configuration of a wireless communications network which uses some of the terminology proposed for NR and 5G is shown in FIG. 1. In FIG. 1 a plurality of transmission and reception points (TRP) 10 are connected to distributed control units (DU) 11.1, 11.2 by a connection interface represented as a line 3. Each of the transmitter receiver points (TRP) 10 is arranged to transmit and receive signals via a wireless access interface within a radio frequency bandwidth available to the wireless communications network. Thus within a range for performing radio communications via the wireless access interface, each of the TRP 10, forms a cell of the wireless communications network as represented by a dashed line 8. As such wireless communications devices 12 which are within a radio communications range provided by the cells 10 can transmit and receive signals to and from the TRP 10 via the wireless access interface. Each of the distributed control units 11.1, 11.2 are connected to a co-ordinating unit (CU) 14 via an interface 16. The CU 14 is then connected to the a core network 17 which may contain all other functions required for communicating data to and from the wireless communications devices and the core network 17 may be connected to other networks 18.

The elements of the wireless access network shown in FIG. 1 may operate in a similar way to corresponding elements of an LTE network well-known and defined in the relevant standards administered by the 3GPP® body, and also described in many books on the subject, for example, Holma H. and Toskala A [2]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The transceiver processors TRP 10 of FIG. 1 may in part have a corresponding functionality to a base station or eNodeB of an LTE network, and so the terms TRP and eNodeB in the following description are interchangeable. Base stations, which are an example of radio network infrastructure equipment, may also be referred to as transceiver stations/NodeBs/eNodeBs (eNBs)/gNodeBs (gNBs), and so forth. Similarly the communications devices 12 may have a functionality corresponding to devices know for operation with an LTE network and may also be referred to as mobile stations, user equipment (UE), user terminal, terminal device, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Pre-Authorised Quality of Service Flows

Figure 2:
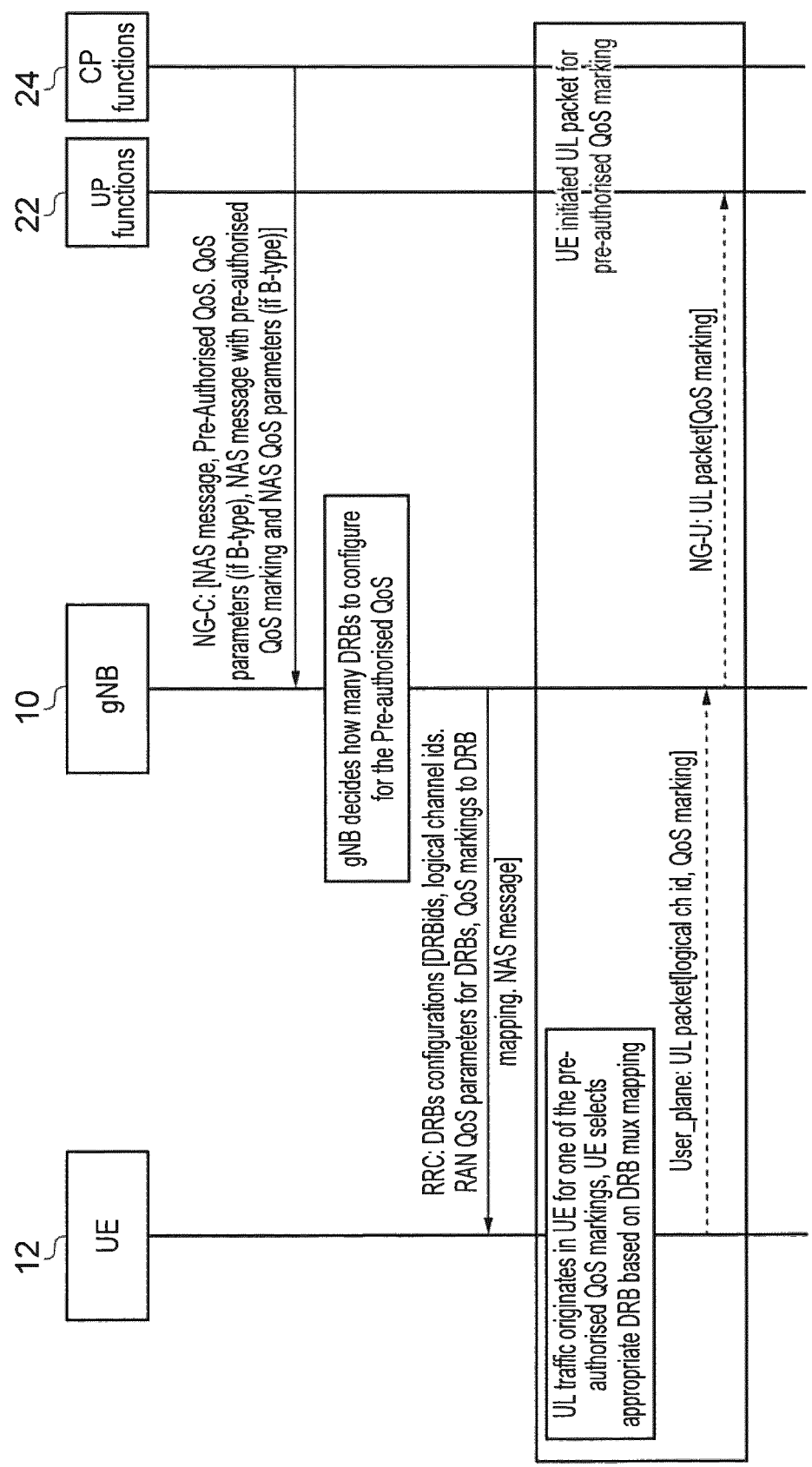
FIG. 2 is a part schematic block diagram, part flow diagram, which has been reproduced from [4], and shows how pre-authorised QoS (PAQ) rules and uplink packet handling may be established.

Pre-authorised Quality of Service (QoS) flows are included in the 3GPP SA2 Technical Report 23.799 [3] and in an Intel paper [4], from which FIG. 2, relating to pre-authorised QoS (PAQ) flows, is reproduced along with some of the accompanying wording. FIG. 2 shows how PAQ rules and uplink packet handling may be established, between a UE 12 and a gNB 10, in terms of both user plane 22 and control plane 24 functions. The uplink traffic handing at the UE 12 is similar to that for any other data radio bearers (DRBs) which are not used to support PAQ flows, though it may be the case that DRBs are provided by the gNB 10 in advance of potential data for transmission. Further to this, the gNB 10 may police the QoS marking used by the UE 12. Depending on the number of PAQ markers expected, it may be further necessary to consider optimisations to avoid reserving DRB identifiers and logical channel identifiers for these DRBs as they may not be used most of the time. No additional handling needs to be specified for PAQ marking at the radio access network (RAN)/access stratum (AS) level beyond that which is defined for other QoS marking Optimisations to avoid pre-allocating DRB identifiers and logical channel identifiers can be considered if SA2 decides on many PAQ markings.

It is proposed in [4] that no new behaviour is required. Some examples for which PAQ flows are considered include mission critical push to talk (MCPTT) applications or office Skype. It is seemingly assumed in [4] that DRBs are set up immediately for a PAQ flow, though it is known [5] that the set up of DRBs may happen at a later stage when there is actual data for transmission.

In embodiments of the present technique, it is assumed that a UE configured with PAQ flows can be configured to be in the RRC_Connected and RRC_Inactive states.

If such a UE is in the RRC_Connected state, then the focus in the present disclosure is on how to handle such QoS flows at handover, where the target cell is congested and can only partially accept the number of QoS flows for this UE. Embodiments of the present technique define UE behavior if one of the PAQ flows is suspended or not accepted by the target cell. RAN3 is working under the assumption that PAQ flows are supported by non-guaranteed bit rate (GBR) bearers and waiting for SA2 confirmation as to whether GBR bearers could also be configured with respect to PAQ flows. However, in embodiments of the present technique, the PAQ flow could be associated with either GBR or non-GBR bearers.

Below is some background text, reproduced from RAN3 TR 38.801 [6], relating to some key principles for QoS in RAN.

The following design principles for handling protocol data unit (PDU) Sessions and QoS flows related context data and respective resources at the new RAN apply:
  New RAN receives QoS related information through NG-C PDU Session control signalling.
  A PDU Session context includes a per PDU session default QoS rule and may include per PDU session pre-authorised QoS rules. The default QoS rule is valid for all packets not marked for specific QoS treatment. A pre-authorised QoS rule is any non-default QoS rule. The content of the per PDU Session default QoS rule and per PDU session pre-authorised QoS rules is for further study.
  During the lifetime of PDU Session context, the per PDU session default QoS rule may be modified and per PDU session pre-authorised QoS rules may be added, modified or deleted.
  GBR QoS flow establishment requires explicit signalling on NG-C.
  The default QoS rule and any pre-authorised QoS rule are only applicable for non-GBR QoS flows. (This is for further study in SA2)
  New RAN does not support packet filtering.
  QoS rules are either defined along "A-type QoS profiles", similar to QCI indication in EPS, which have standardized QoS characteristics, or along "B-type QoS profiles" which have QoS characteristics dynamically signalled over NG-C.
  QoS rules established for a PDU Session can be represented as a linear, indexed list of implicit (standardised) or explicit (dynamic) QoS rule descriptors.

The following design principles for handling QoS aspects of the UE context at the New RAN apply:
  A per UE UL and DL rate limit, provided to the serving New RAN node, shall be obeyed.

The following design principles for handling QoS aspects on NG-U apply:
  User plane marking for QoS is carried in encapsulation header on NG-U.
  Upon detection of a new non-GBR QoS flow on NG-U the New RAN node decides the mapping to radio resources, i.e. it may decide to create new radio resources or map it to existing radio resources. (This is for further study in RAN2). Whether additional QoS flow identifiers are needed and their relation to QoS marking is also for further study.
  If a user data packet does not contain a QoS rule indication, the default QoS rule applies. Whether more than one QoS flow obeying the same QoS rule may be established per PDU session is for further study.

Additionally, whether additional QoS flow identifiers are needed and their relation to QoS marking is for further study The resulting information flow between the UE, New RAN and NGC can be depicted in the following way:
  The NGC provides QoS information to the UE: NAS-level QoS profiles (A- or B-type), packet filters and precedence order.
  RAN will apply a specific QoS profile based on information received from the Core Network.
  User plane marking for QoS is carried in encapsulation header on NG-U.
  RAN receives QoS rules at PDU Session establishment using NG-C signalling.
  For uplink traffic, it is up to RAN to determine the QoS marking and select an appropriate tunnel based on the QoS-flow-to-DRB mapping decided by the New RAN node (for further study).
  For downlink traffic, it is up to RAN to bind the traffic onto a corresponding DRB based on the NG-U marking and the corresponding QoS characteristics provided through NG-C signalling, also taking into account the NG-U tunnel associated with the DL packet.

Based on this text from [6] and the relevant agreements, it seems that the gNB may or may not be aware of the presence of PAQ flows. According to [6] a previous proposal has been to the effect that the QoS rules/policy are configured to set the new RAN for the PAQ flows. However there is no indication of whether the UE is configured with PAQ FLOWS. In other words, according to the arrangement disclosed in [6], the new RAN node know what to do when it see a packet marked with PAQ marking, by applying PAQ rules, but there is no indication that the gNB is aware of QoS rules/PAQ rules/policies. The gNB is therefore not aware of the actual flows which with the UE is pre-authorised. However, embodiments of the present technique relate to the arrangements in which the gNB is always aware of PAQ flows, and the needs for this are analysed.

Some further RAN2 agreements on QoS include:

A new user plane AS protocol layer (e.g. PDAP) above PDCP should be introduced to accommodate all the functions introduced in AS for the new QoS framework, including:
QOS flow→DRB routing;
QoS-flow-id marking in DL packets;
QoS-flow-id marking in UL packets;

The new protocol layer is applicable for all cases connecting to the 5G-CN

Single protocol entity is configured for each individual PDU session.

Figure 3:
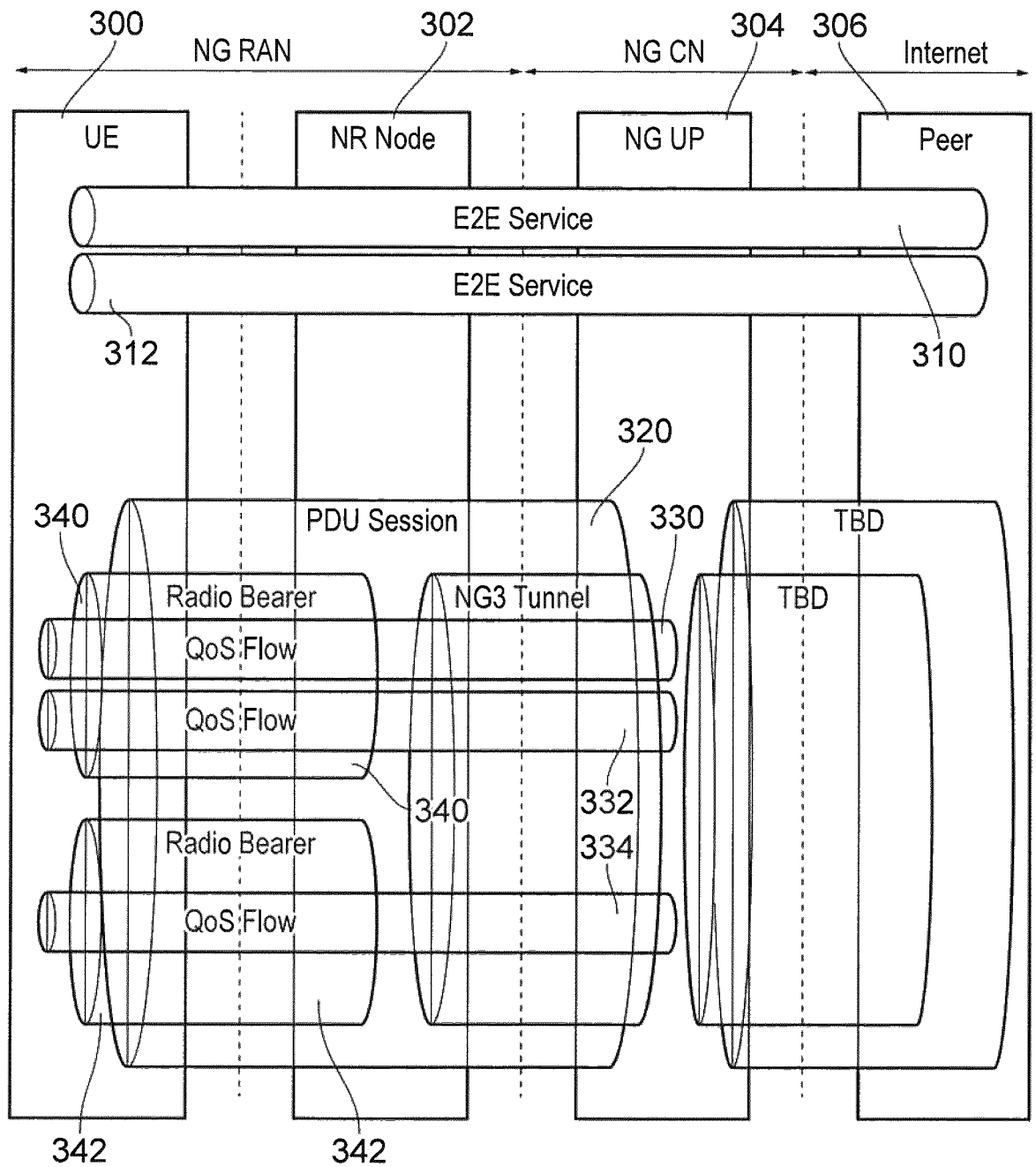
FIG. 3 is a schematic representation illustrating how data radio bearers, QoS flows and protocol data units (PDUs) are mapped throughout a radio access network.

FIG. 3 has been approved by RAN for QoS architecture, and shows how data radio bearers, QoS flows and protocol data units (PDUs) are mapped throughout a radio access network, comprising a UE 300 and NR node 302, core network 304 and internet peer 306. The UE 300 and peer 306 are connected via end-to-end services 310 and 312, while the UE 300 communicates with the core network 304 via a PDU session 320. Three QoS flows 330, 332 and 334, which may be PAQ flows, belong to the PDU session 320, and are associated with radio bearers (DRB) 340 and 342. One PDU session may be mapped to one or more DRBs and one PDU session may have multiple QoS flows, and there could be multiple PDU sessions supported by the UE 300. It is assumed that each PAQ flow belongs to a PDU session and will require setup of a DRB on the uplink when the UE 300 has data for transmission related to the PAQ flow. If a DRB is already setup at the time of the PAQ flow setup then the UE 300 can send data using this DRB.

If the target node is too congested to be able to accept the PAQ flow, and the source node still continues with the handover, then it is necessary to know how to map QoS flows to DRBs on the uplink. A current RAN2 working assumption is detailed in [7]:

If an incoming UL packet matches neither an RRC configured nor a reflective "QoS Flow ID to DRB mapping", the UE shall map that packet to the default DRB of the PDU session.

This assumption implies that a default DRB is configured for each PDU session and a separate DRB can also be set up later. There have been concerns expressed on the number of DRBs being supported in the system. DRB ID is mapped to logical channel ID (LCID) and LCID is included in the user plane header. So, even if a UE supports a single DRB, still every packet needs to support the maximum LCID size, increasing the overheads. This concern may have an impact on the number of DRBs supported including the number of default DRBs per PDU sessions. If a default DRB is not supported then the UE shall send data on a new DRB and DRB configuration may be provided in real time or in advance using RRC messages.

Further, the above RAN2 working assumption from [7] applies to PAQ flows on the uplink. However, the UE should know when to request or expect a dedicated DRB for PAQ flow(s). Even if a DRB existed in the source cell, the target cell may not be able to accommodate the traffic related to PAQ flows due to admission control and may not have enough resources or uplink grant that the UE can transmit all data including data related to PAQ flows. Uplink grant or logical channel priority may allocate a higher priority to PAQ flow DRBs.

Secondly, if such a UE is in RRC-Inactive state, embodiments of the present technique focus on the need to have priority in the paging message for such a UE.

Handover and Paging Procedure for PAQ Flows

Potential problems may arise when a UE has a combination of DRBs related to either multiple PAQ flows or single. In addition, when a UE has a combination of PAQ flow and normal QoS flows, and handover is initiated to a target cell which only can accommodate parts of the UE configuration, then it is not currently known how the network should handle the situation and whether there is a need for new UE behaviour.

Early handover has been discussed in RAN2. In this case, the gNB will start the initiation of the handover procedure by checking whether the target gNB can accept the handover or not. If the target gNB is not able to accept all DRB/service flows from the source gNB, then it would be possible to mark these flows. The UE could be notified in this instance. Additionally, for early handover or conditional handover, the UE may be informed in advance to prepare for the handover, and based on certain conditions, initiate the handover autonomously or via a trigger from the network.

The network load situation can change between the time the source gNB sent the early handover command and when the UE actually moves to the cell. So, a target node can accept an early handover request based on its current load but if the load increases afterwards, the target node may find that it is unable to honor the handover, or the PAQ flow may be dormant in the serving cell but has data to transfer during handover or just before handover. In such cases, and according to embodiments of the present technique, the target eNB may either:

Rejects the handover in RAR (explicit signaling rather than simply not responding to RA preamble) or similar if RA is not needed (RACH-less handover case);

Accept it as mentioned below.

Figure 4:
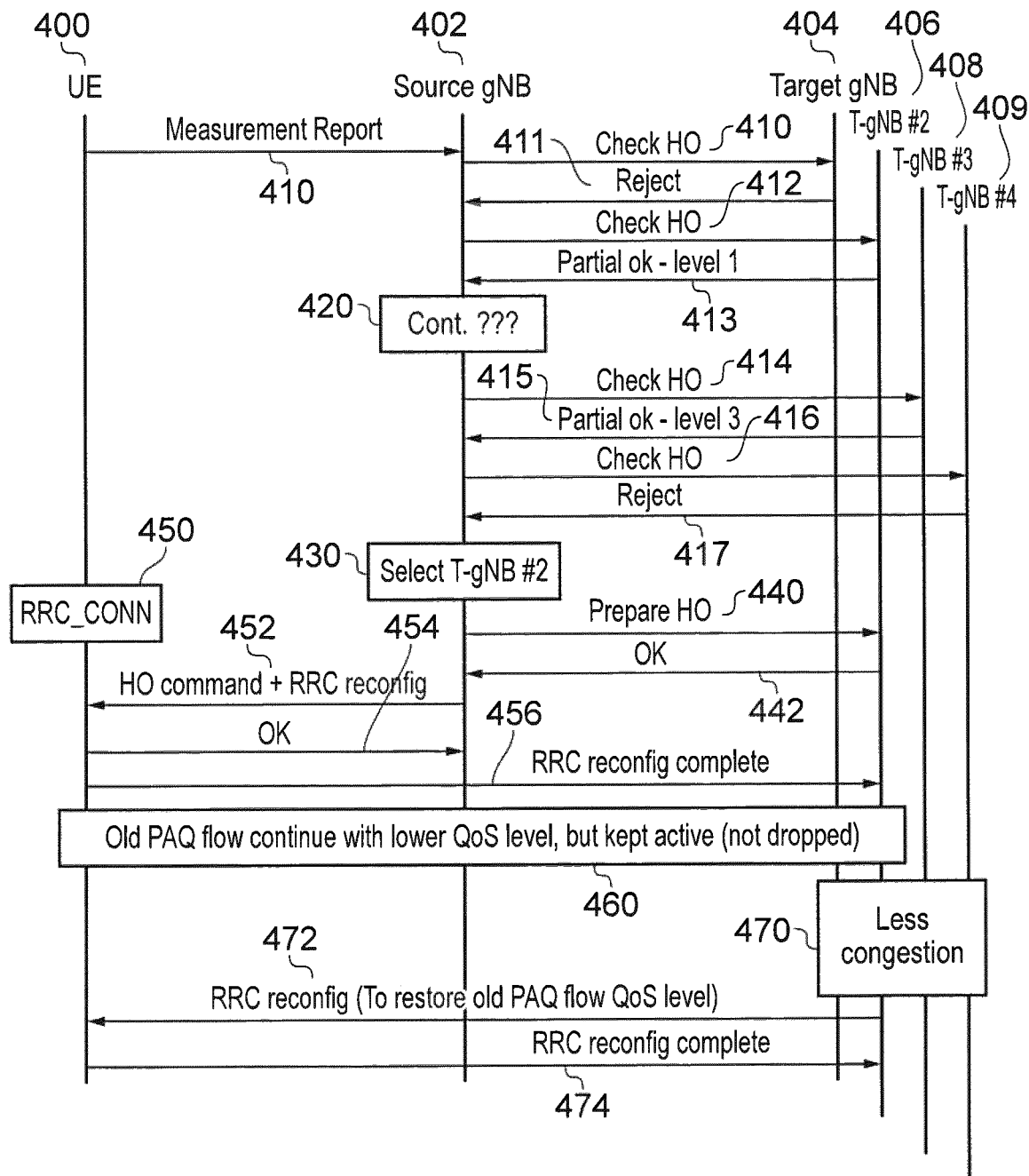
FIG. 4 is a first example of a message flow diagram of an example of a partial handover, from a source gNB currently serving a UE to one of a plurality of potential target gNBs in accordance with embodiments of the present technique.

If the UE mobility continues (or the radio condition worsen, implying that an immediate handover is needed), then eventually the measurement reports from the UE to the source gNB will trigger a handover, as it is not possible to provide the service anymore in the source gNB. The source gNB has two choices in this case:

Do not conduct the handover to a target gNB that is not able to handle all the PAQ flows; or Commence with the handover to a target gNB with service limitations. In embodiments of the present technique, this is termed a partial handover, and a message flow diagram of an example of a partial handover, from a source gNB 402 currently serving a UE 400 to one of a plurality of potential target gNBs 404, 406, 408, 409, is shown in FIG. 4.

The process begins with the UE 400 transmitting a measurement report 410 to the source gNB 402, comprising an indication of channel conditions. Due to potential worsening of those conditions, or the movement of the UE 400 in a direction away from the source gNB 402, the source gNB 402 may deem it necessary to perform a handover. In such an instance, the source gNB 402 transmits messages 410 412, 414, 416 to the target gNBs 404, 406, 408, 409. The first target gNB 404 rejects 411 the handover, by the second gNB 406 indicates 413 that it can accept a partial handover. This indication 413 may include an available service level signalled to the source gNB 402. At this point, the source gNB 402 must determine whether to continue 420 checking whether the target gNBs can accept a full handover, or proceed with the partial handover to the second target gNB 406. New logic is required in the source gNB 402 in order to evaluate to continue checking more target gNBs. In the example of FIG. 4, the source gNB 402 decides to continue, and receives another indication 415 that the third gNB 408 can accept a partial handover, and another rejection 417 from the fourth gNB 409. The source gNB 402 then selects 430 the second target gNB 406, and instructs it to prepare for the handover 440, for which it receives an acknowledgement 442. The UE 400 enters the RRC_Connected state 450, and receives a handover command and instruction to reconfigure its RRC settings 452 from the source gNB 402, in response to which it transmits an acknowledgement 454. Once the RRC reconfiguration has been completed, the UE 400 signals this 456 to the second target gNB 406, which becomes the serving gNB for the UE 400. The UE retains its former PAQ flows, but because the second target gNB 406 could only accept (due to congestion) a partial handover, these PAQ flows are retained with a lower QoS level 460. Here, a new handover command from the source gNB 402 is therefore extended with an instruction for the change of QoS for specific flows, in order to enable starving of the high QoS flows. At a point later in time, when the congestion at the second target gNB 406 falls 470, and it determines that it can accept all PAQ flows from the UE 400 at their original levels, it transmits another RRC reconfiguration message 472 to the UE 400, and once the UE 400 has acted accordingly, receives an indication 474 from the UE 400 that the RRC reconfiguration is complete.

In other words, the first infrastructure equipment is configured to receive signals from the second infrastructure equipment, the second infrastructure equipment currently serving the communications device, comprising signalling indicating that a handover procedure should be performed, the signalling comprising the indication that the communications device is preparing to transmit or receive data with the PAQ flows, to determine that the first infrastructure equipment is able to serve the communications device with a selected one or more of the PAQ flows, to transmit, as part of the handover procedure, an indication to the second infrastructure equipment that the first infrastructure equipment is able to serve the communications device with the selected PAQ flows, and to receive, as part of the handover procedure, an indication from the second infrastructure equipment that the first infrastructure equipment should begin serving the communications device with the selected PAQ flows.

An LTE eNB can prepare multiple target eNBs and target eNB may accept part of the UE configuration. It is up to the source eNB to decide if it accepts the target for handover or performs handover cancellation. Below is the handling in [8] and [9] for the partial handover case.

Provides a reason for the handover cancellation. The target eNB did not admit all E-RABs included in the HANDOVER REQUEST and the source eNB estimated service continuity for the UE would be better by not proceeding with handover towards this particular target eNB.

The partial handover could also be triggered/initiated due to congestion in the cell, i.e. the gNB is not able to provide enough bandwidth to support all ongoing data flows. This of course assumes there is a suitable gNB that can provide some level of service. The gNB again has two choices in this case. It can Drop flows that have low priority flows then the target gNB is able provide, or Associate a high QoS flow with lower service level flow (move the flow to a DRB with lower QoS).

In the second case, the application will suffer from the lower QoS and a user might choose to manually close the application being used in the UE, or if the service level is still acceptable for the user, to keep the application running; it may be of poor quality, but good enough for something.

In other words, in embodiments of the present technique, each PAQ flow has an associated priority level. The determination made by the first infrastructure equipment that it is able to serve the communications device with the selected PAQ flows comprises an indication of one or more of the PAQ flows having a priority level below a threshold priority level should not be included within the handover. In some embodiments, the first infrastructure equipment is configured to receive an indication from the second infrastructure equipment of an association of one or more of the PAQ flows currently associated with a first set of one or more radio bearers with a second set of one or more radio bearers in place of the first set of radio bearers, the second set of radio bearers having a lower priority level than the first set of radio bearers. The first infrastructure equipment is configured to receive an indication from the second infrastructure equipment of an association of one or more of the PAQ flows currently associated with a first set of one or more radio bearers with a second set of one or more radio bearers in place of the first set of radio bearers, the second set of radio bearers having a lower priority level than the first set of radio bearers.

Once the congestion situation improves (in the new cell), the network could initiate a PDU session modification, and move the PDU session to a DRB with the same QoS as it had prior to the handover. RAN2 agreed not to multiplex more than one PDU session to a single DRB, although QoS flow modification can be done and DRB can still be changed as suggested. If a PAQ flow belongs to a separate PDU session then it does not work. In other words, if predetermined conditions are met, the first infrastructure equipment is configured to associate the one or more of the PAQ flows with the first set of radio bearers in place of the second set of radio bearers.

If the target cell rejects the complete handover then source cell shall keep trying to find the next best cell without any involvement of the UE. If the target cell partially accepts the handover due to ongoing congestion and some of the DRBs need to be released, then UE shall be informed in the handover command. It may be the case that the released DRB corresponds to a PAQ flow.

New behaviour according to embodiments of the present technique includes:

The gNB shall always be aware of if PAQ flows are configured for the UE. Such information is included during Context setup in the initial context setup or PAQ flow setup signaling from CN to gNB. In other words, the infrastructure equipment is configured to receive the indication during an attachment process between the communications device and the wireless communications network, or alternatively at a time when the PAQ flows are first pre-authorised, or are modified in any way (such as becoming no longer pre-authorised). Or From source gNB to target gNB in handover preparation phase signaling during the handover procedure. In other words, the infrastructure equipment is a first infrastructure equipment, the first infrastructure equipment being configured to receive the indication from a second one of the infrastructure equipment.

The UE is informed if it has to use a default DRB or dedicated DRB for PAQ flow. DRB signaling explicitly indicates that this DRB is for a PAQ flow. The UE may also request DRB setup. In other words, these data radio bearers may be dedicated radio bearers which are specific to the PAQ flow they support, or may be default radio bearers which are common to more than one of the PAQ flows. In either case, in some embodiments, the infrastructure equipment is configured to indicate to the communications device that the radio bearers are dedicated radio bearers or default radio bearers. Further, the infrastructure equipment is configured to indicate to the communications device that these dedicated or default bearers are configured to support the PAQ flows. The bearers may have guaranteed bit rates (GBR) or non-guaranteed bit rates (non GBR).

The introduction of a backoff timer in HO Command to the UE to defer the setup of a PAQ flow DRB. In other words, in some embodiments of the present technique, the communications device is configured to receive a handover command from the second infrastructure equipment, the handover command comprising an indication that the first infrastructure equipment is now serving the communications device, and a backoff timer, wherein the setup of a new radio bearer for one or more of the PAQ flows is deferred until the backoff timer has elapsed.

Figure 5:
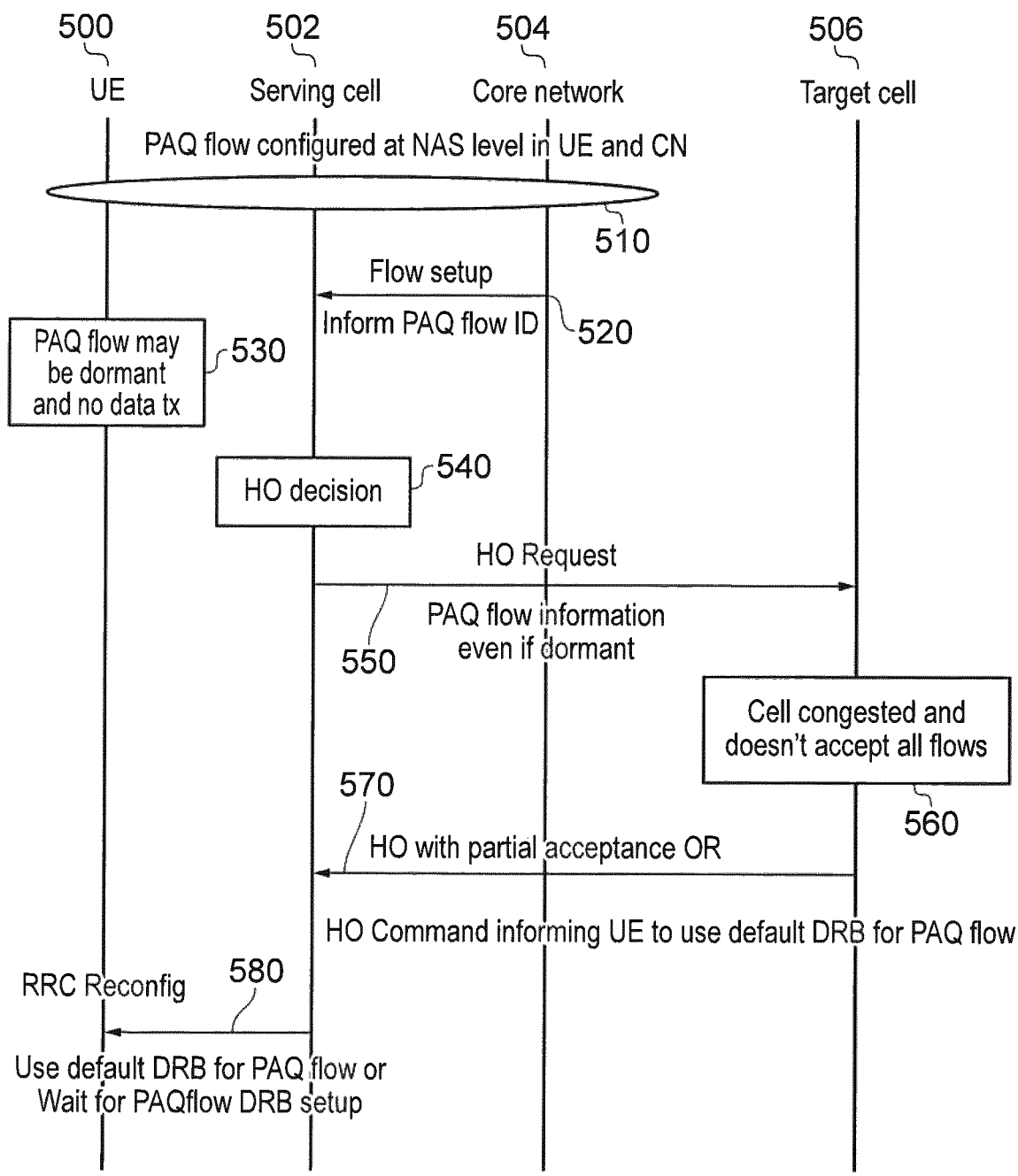
FIG. 5 is a second example of a message flow diagram of an example of a partial handover, from a source gNB currently serving a UE to one of a plurality of potential target gNBs, where the source gNB is aware of configured PAQ flows even if no associated bearer is configured during the time the UE is being served by the source gNB, in accordance with embodiments of the present technique.

The serving gNB is aware of configured PAQ flows even if no associated DRB is configured during the time when the UE is staying in the serving cell. An example of such a case is shown in FIG. 5. PAQ flows are configured 510 at the NAS level in a UE 500 and core network 504, and a serving cell 502 is made aware of this 520 by the core network 504. It may the case that the PAQ flow is dormant 530 and the UE 500 has no data to transmit. The serving cell makes a decision 540 that a handover is required, and transmits a request 550 to a target cell 506. The target cell however is congested 560, and therefore cannot accept all flows, so transmits an indication 570 to the serving cell that it can either partially accept the handover, or that the UE 500 should use a default DRB instead for the PAQ flow. The source cell then transmits a handover command 580 to the UE 500 instructing it to reconfigure its RRC settings.

The newly serving cell 502 is proposed to include information in a handover command or similar message that will convey to the UE 500 if it is permitted to use default DRB or a new DRB for PAQ flows. New DRB setup may be delayed and in the meantime the UE 500 is permitted to use default DRB. It has been proposed that the UE may be allowed to request DRB setup for PAQ flow and some embodiments of the present technique introduce a minimum backoff timer for the DRB setup request. Until a congestion resolution, the UE is allowed to use a default DRB for sending the data. The congestion situation does not remain the same forever in the target (now serving) cell. For downlink data in the RRC_Connected state, the gNB can set up a bearer when needed.

Enhancing Paging Message in RRC-Inactive State

There have been no discussions as to whether a UE configured with PAQ flow can be configured to move to the RRC-Inactive state. A UE configured with PAQ flows cannot enter the RRC-Idle state as this will imply that the bearer or flow between the core network and gNB is released, which is against the SA2 agreement.

Figure 6:
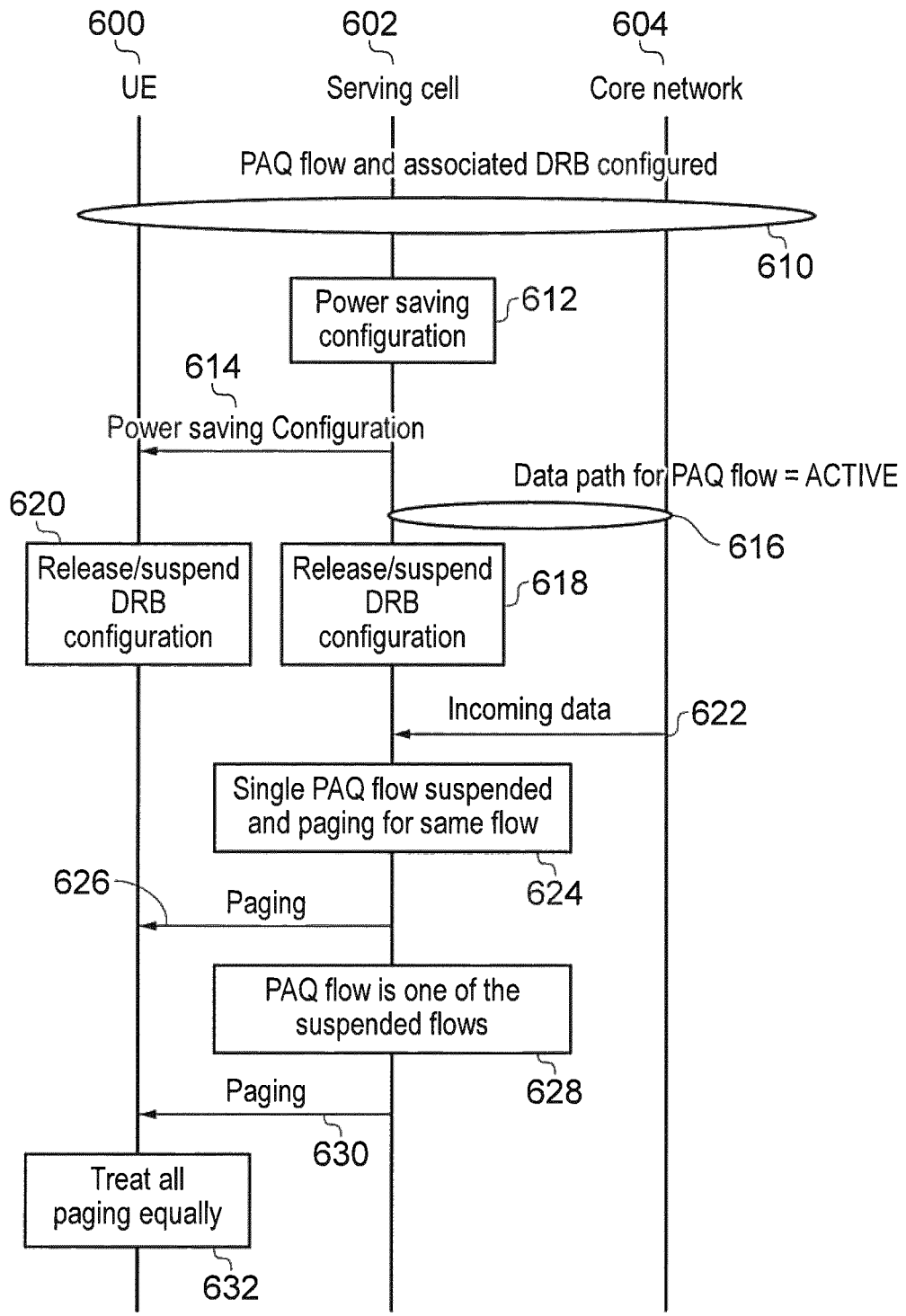
FIG. 6 is an exemplary message flow diagram of a paging process in a communications system comprising a UE configured with PAQ flows in accordance with embodiments of the present technique.

Embodiments of the present technique propose that a UE configured with PAQ flow is allowed to enter RRC-Inactive or any other power saving state. In other words, the communications device is configured, when there is no data for transmission, to enter a power saving state. This power saving state may be the RRC-Inactive state. PAQ flows are configured for high priority bearers but power consumption is equally important and data traffic is variable in nature. If no further enhancements are proposed, then such embodiments result in a message sequence such as that shown in FIG. 6 between a UE 600, a serving cell 602 and the core network 604. PAQ flows are configured 610 at the between the UE 600 and core network 604, and the serving cell 602 is made aware of this. The serving cell has a power saving configuration 612, and instructs 614 the UE 600 that this configuration should be used. Upon a data path for the PAQ flow(s) becoming active 616, both the UE 600 and serving cell 602 either release or suspend their bearer configurations 618, 620, and incoming data 622 is received at the serving cell 602 from the core network 604.

When UE is in RRC-INACTIVE state, then RAN based paging 624 to 632 is used to inform the UE about incoming data at the base station. If the UE has pre-authorised QoS flows which are inactive i.e. there is no associated DRB configured and active, then UE and network needs to prioritise the resumption of pre-authorised QoS flows. The UE shall be informed that the data is related to pre-authorised QoS flow. (e.g. Flow-id or DRB ID assigned for PAQ flow).

LTE does not have any priority mechanism, and so one could argue that it may not be needed for pre-authorised QoS flows as well. However, LTE does not have high priority bearers active in NAS layer only, with no associated AS layer transport mechanism. Another assumption is that UEs in RRC-Inactive (light connection in LTE) state have low priority bearers, and this will change with PAQ flows.

So, in some embodiments of the present technique, RAN based paging messages are extended to include the information indicating if this paging message corresponds to a PAQ flow. Such information may also indicate to the UE to use, for example, the 2-step RACH or 4-step RACH procedure.

In response the UE can indicate the same priority in
msg1 (either new RA preamble design or pick a preamble from reserved set of preambles for PAQ flows) and/or
msg3 (e.g. new establishment cause) so that network is aware and prioritise or ensure the bearer is re-established fast and ensure resources are available for such a bearer. Normally mt-access is treated with the same priority but need to distinguish incoming data for different types of services. This may also help prioritising the resource allocation on the network side for particular UEs
msg 5 or later Alternatively, paging messages are not extended but msg 2 or msg 4 include the information as described above to include flow and priority related information. Alternatively, dedicated resource allocation e.g. by preamble grouping can be used to prioritise access for small data transmissions on RACH or grant-less operation, whereby separate resources are reserved if the UE has data corresponding to a PAQ flow. In other words, in these embodiments of the present technique, the infrastructure equipment is configured to transmit a paging message to the communications device, and to receive the indication that the communications device is preparing to transmit or receive data with the PAQ flows from the communications device in response to the paging message. The indication that the communications device is preparing to transmit or receive data with the PAQ flows is received from the communications device in accordance with at least one of a random access preamble (msg1), a new establishment cause (msg3), and a message transmitted by the communications device to the infrastructure equipment subsequent to a contention resolution message (msg5 or later). In some arrangements of these embodiments, each PAQ flow has an associated priority level and has been inactive before the reception of the paging message at the communications device. Here, the communications device is configured to indicate, with the indication that the communications device is preparing to transmit or receive data with the PAQ flows, the associated priority levels of the PAQ flows to the infrastructure equipment.

Figure 7:
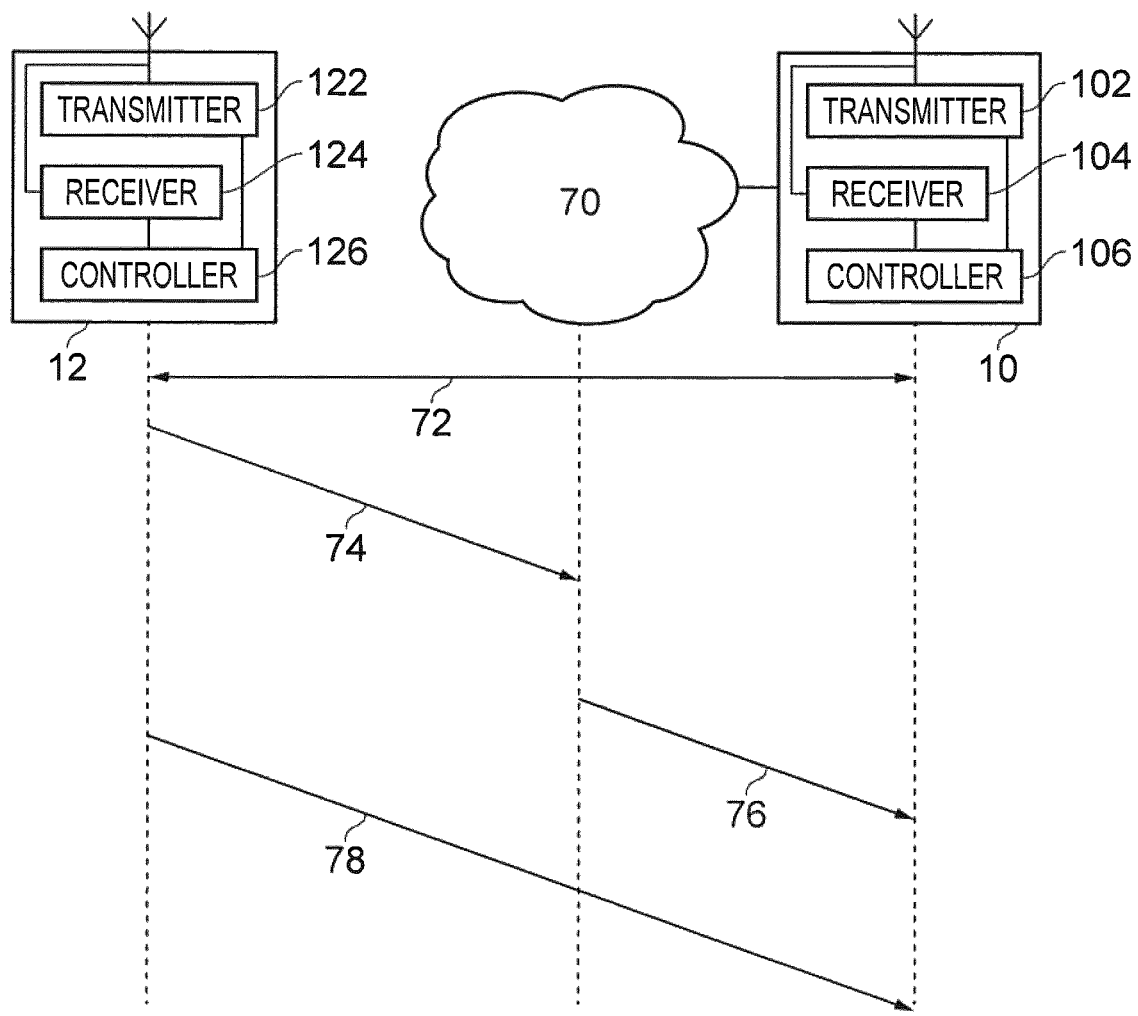
FIG. 7 is a part schematic representation, part message flow diagram of communications in a communications system in accordance with embodiments of the present technique.

In a broad sense, FIG. 7 provides a part schematic representation, part message flow diagram of communications in a communications system in accordance with embodiments of the present technique; and a part schematic representation, part message flow diagram of communications between a communications device or UE 12 and a wireless communications network 70 in accordance with embodiments of the present technique. The communications device 12 comprises a transmitter (or transmitter circuitry) 122 configured to transmit signals to one or more infrastructure equipment or gNBs 10 of the wireless communications network 70 via a wireless access interface 72 provided by the one or wireless communications network 70, a receiver (or receiver circuitry) 124 configured to receive signals from the one or more infrastructure equipment 10 via the wireless access interface 72, and a controller (or controller circuitry) 126 configured to control the transmitter circuitry 122 and the receiver circuitry 124 to transmit or to receive the signals representing data. As can be seen in FIG. 7, the infrastructure equipment 10 also comprises a transmitter (or transmitter circuitry) 102 configured to transmit signals to the communications device 12 via the wireless access interface 72, a receiver (or receiver circuitry) 104 configured to receive signals from the communications device 12 via the wireless access interface 72, and a controller (or controller circuitry) 106 configured to control the transmitter circuitry 102 and the receiver circuitry 104 to transmit or to receive the signals representing data. Each of the controllers 126, 106 may be, for example, a microprocessor, a CPU, or a dedicated chipset, etc. The communications device 12 is configured 74 to transmit or receive signals via the wireless access interface 72 to or from a peer terminal in the wireless communications network 70 with one or more pre-authorised quality of service, PAQ, flows, at least one of the PAQ flows currently being inactive, wherein one or more of the infrastructure equipment 10 are configured 76 to receive an indication that the communications device 12 is preparing 78 to transmit or receive data with the PAQ flows supported by the radio bearers to or from the one or more of the infrastructure equipment 10.

Figure 8:
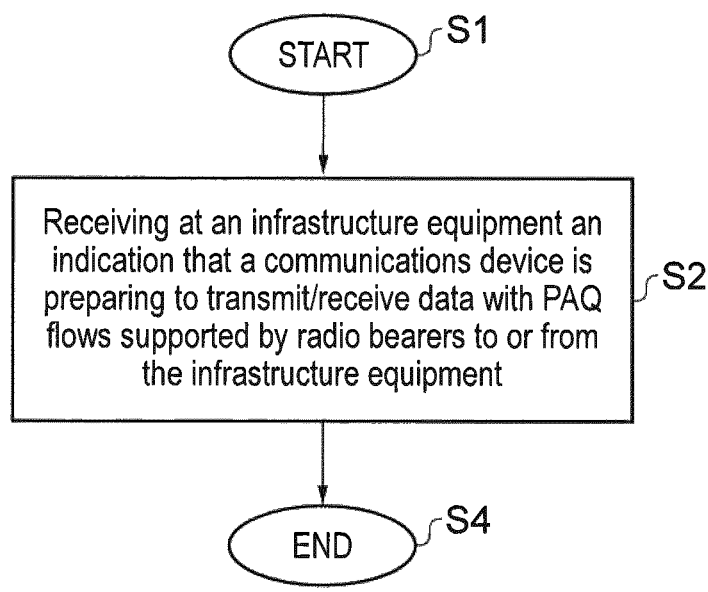
FIG. 8 shows a flow diagram illustrating a process of communications in a communications system in accordance with embodiments of the present technique.

FIG. 8 shows a flow diagram illustrating a process of communications in a communications system in accordance with embodiments of the present technique. The method, which is a method of operating the communications system, begins in step S1. The method comprises, in step S2, for a communications device configured to transmit or receive signals via a wireless access interface provided by the wireless communications network to or from a peer terminal in the wireless communications network with one or more pre-authorised quality of service, PAQ, flows, at least one of the PAQ flows currently being inactive, receiving at the infrastructure equipment an indication that the communications device is preparing to transmit or receive data with the PAQ flows supported by the radio bearers to or from the one or more of the infrastructure equipment. The process ends in step S4.

Embodiments of the present technique also relate to communications devices and infrastructure equipment as described in the preceding paragraphs in relation to communications systems, along with methods of operating and circuitry for the same. Those skilled in the art would appreciate that such communications devices and/or infrastructure equipment may be further defined in accordance with the various arrangements and embodiments discussed in the preceding paragraphs, where these communications devices and/or infrastructure equipment form part of communications systems other than those described.

The following numbered paragraphs provide further example aspects and features of the present technique:

Paragraph 1. A communications system, comprising
one or more infrastructure equipment forming part of a wireless communications network, and
a communications device configured to transmit or receive signals via a wireless access interface provided by the wireless communications network to or from a peer terminal in the wireless communications network with one or more pre-authorised quality of service, PAQ, flows, at least one of the PAQ flows currently being inactive,
wherein one or more of the infrastructure equipment are configured to receive an indication that the communications device is preparing to transmit or receive data with the PAQ flows to or from the one or more of the infrastructure equipment.

Paragraph 2. A communications system according to Paragraph 1, wherein when predetermined conditions are met, the infrastructure equipment is configured to set up a radio bearer to support at least one of the of the PAQ flows.

Paragraph 3. A communications system according to Paragraph 2, wherein the predetermined conditions comprise at least one of the one or more PAQ flows becoming active.

Paragraph 4. A communications system according to Paragraph 2 or Paragraph 3, wherein one or more of the radio bearers are dedicated radio bearers which are specific to the PAQ flow they support.

Paragraph 5. A communications system according to Paragraph 2 or Paragraph 3, wherein one or more of the radio bearers are default radio bearers which are common to more than one of the PAQ flows.

Paragraph 6. A communications system according to Paragraph 4 or 5, wherein the infrastructure equipment is configured to indicate to the communications device that the one or more of the radio bearers are dedicated radio bearers and/or that the one or more of the radio bearers are default radio bearers.

Paragraph 7. A communications system according to Paragraph 6, wherein the infrastructure equipment is configured to indicate to the communications device that the dedicated radio bearers and/or the default radio bearers are configured to support the PAQ flows.

Paragraph 8. A communications system according to any of Paragraphs 2 to 7, wherein one or more of the radio bearers has a guaranteed bit rate.

Paragraph 9. A communications system according to any of Paragraphs 2 to 7, wherein one or more of the radio bearers has a non-guaranteed bit rate.

Paragraph 10. A communications system according to any of Paragraphs 1 to 9, wherein the infrastructure equipment is configured to receive the indication during an attachment process between the communications device and the wireless communications network.

Paragraph 11. A communications system according to any of Paragraphs 1 to 9, wherein the infrastructure equipment is configured to receive the indication from the wireless communications network at a time when the PAQ flows are pre-authorised.

Paragraph 12. A communications system according to any of Paragraphs 1 to 9, wherein the infrastructure equipment is configured to receive the indication from the wireless communications network at a time when the PAQ flows are modified.

Paragraph 13. A communications system according to any of Paragraphs 1 to 12, wherein the infrastructure equipment is a next generation Node B, gNB, the gNB currently serving the communications device.

Paragraph 14. A communications system according to any of Paragraphs 1 to 12, wherein the infrastructure equipment is a next generation Node B, gNB, the gNB being the target of a handover from a second gNB, the second gNB currently serving the communications device.

Paragraph 15. A communications system according to Paragraph 2, wherein the infrastructure equipment is a first infrastructure equipment, the first infrastructure equipment being configured to receive the indication from a second one of the infrastructure equipment.

Paragraph 16. A communications system according to Paragraph 15, wherein the first infrastructure equipment is configured
to receive signals from the second infrastructure equipment, the second infrastructure equipment currently serving the communications device, comprising signalling indicating that a handover procedure should be performed, the signalling comprising the indication that the communications device is preparing to transmit or receive data with the PAQ flows,
to determine that the first infrastructure equipment is able to serve the communications device with a selected one or more of the PAQ flows,
to transmit, as part of the handover procedure, an indication to the second infrastructure equipment that the first infrastructure equipment is able to serve the communications device with the selected PAQ flows, and
to receive, as part of the handover procedure, an indication from the second infrastructure equipment that the first infrastructure equipment should begin serving the communications device with the selected PAQ flows.

Paragraph 17. A communications system according to Paragraph 16, wherein each PAQ flow has an associated priority level.

Paragraph 18. A communications system according to Paragraph 17, wherein the determination made by the first infrastructure equipment that it is able to serve the communications device with the selected PAQ flows comprises an indication of one or more of the PAQ flows having a priority level below a threshold priority level should not be included within the handover.

Paragraph 19. A communications system according to any of Paragraphs 16 to 18, wherein the first infrastructure equipment is configured to receive an indication from the second infrastructure equipment of an association of one or more of the PAQ flows currently associated with a first set of one or more radio bearers with a second set of one or more radio bearers in place of the first set of radio bearers, the second set of radio bearers having a lower priority level than the first set of radio bearers.

Paragraph 20. A communications system according to Paragraph 19 wherein if predetermined conditions are met, the first infrastructure equipment is configured to associate the one or more of the PAQ flows with the first set of radio bearers in place of the second set of radio bearers.

Paragraph 21. A communications system according to any of Paragraphs 16 to 20, wherein the communications device is configured to receive a handover command from the second infrastructure equipment, the handover command comprising
an indication that the first infrastructure equipment is now serving the communications device, and
a backoff timer, wherein the setup of a new radio bearer for one or more of the PAQ flows is deferred until the backoff timer has elapsed.

Paragraph 22. A communications system according to Paragraph 20 or Paragraph 21, wherein the predetermined conditions comprise a congestion level at the first infrastructure equipment falling below a predetermined threshold.

Paragraph 23. A communications system according to any of Paragraphs 1 to 22, wherein the communications device is configured, when there is no data for transmission, to enter a power saving state.

Paragraph 24. A communications system according to Paragraph 23, wherein the power saving state is an RRC-Inactive state.

Paragraph 25. A communications system according to any of Paragraphs 1 to 24, wherein the infrastructure equipment is configured
to transmit a paging message to the communications device, and
to receive the indication that the communications device is preparing to transmit or receive data with the PAQ flows from the communications device in response to the paging message.

Paragraph 26. A communications system according to Paragraph 25, wherein the indication that the communications device is preparing to transmit or receive data with the PAQ flows is received from the communications device in accordance with at least one of
a random access preamble,
a new establishment cause, and
a message transmitted by the communications device to the infrastructure equipment subsequent to a contention resolution message.

Paragraph 27. A communications system according to Paragraph 25 or Paragraph 26, wherein each PAQ flow has an associated priority level and has been inactive before the reception of the paging message at the communications device, and wherein the communications device is configured
to indicate, with the indication that the communications device is preparing to transmit or receive data with the PAQ flows, the associated priority levels of the PAQ flows to the infrastructure equipment.

Paragraph 28. A method of operating a communications system, comprising
one or more infrastructure equipment forming part of a wireless communications network, and
a communications device configured to transmit or receive signals via a wireless access interface provided by the wireless communications network to or from a peer terminal in the wireless communications network with one or more pre-authorised quality of service, PAQ, flows, at least one of the PAQ flows currently being inactive,
wherein the method comprises receiving, at one of the infrastructure equipment, an indication that the communications device is preparing to transmit or receive data with the PAQ flows to or from the one or more of the infrastructure equipment.

Paragraph 29. Circuitry for a communications system, comprising
circuitry for one or more infrastructure equipment forming part of a wireless communications network, and
circuitry for a communications device configured to transmit or receive signals via a wireless access interface provided by the wireless communications network to or from a peer terminal in the wireless communications network with one or more pre-authorised quality of service, PAQ, flows, at least one of the PAQ flows currently being inactive, wherein one or more of the infrastructure equipment are configured to receive an indication that the communications device is preparing to transmit or receive data with the PAQ flows to or from the one or more of the infrastructure equipment.

Paragraph 30. An infrastructure equipment forming part of a wireless communications network comprising transmitter circuitry configured to transmit signals to a communications device via a wireless access interface provided by the wireless communications network, receiver circuitry configured to receive signals from the communications device via the wireless access interface, and controller circuitry configured to receive an indication that the communications device is preparing to transmit or receive data with one or more pre-authorised quality of service, PAQ, flows to or from the infrastructure equipment, at least one of the PAQ flows currently being inactive.

Paragraph 31. A method of controlling an infrastructure equipment forming part of a wireless communications network, the method comprising receiving an indication that the communications device is preparing to transmit or receive data with one or more pre-authorised quality of service, PAQ, flows to or from the infrastructure equipment, at least one of the PAQ flows currently being inactive.

Paragraph 32. Circuitry for an infrastructure equipment forming part of a wireless communications network comprising transmitter circuitry configured to transmit signals to a communications device via a wireless access interface provided by the wireless communications network, receiver circuitry configured to receive signals from the communications device via the wireless access interface, and controller circuitry configured to receive an indication that the communications device is preparing to transmit or receive data with one or more pre-authorised quality of service, PAQ, flows to or from the infrastructure equipment, at least one of the PAQ flows currently being inactive.

Paragraph 33. A communications device, comprising transmitter circuitry configured to transmit signals to an infrastructure equipment forming part of a wireless communications network via a wireless access interface provided by the wireless communications network, receiver circuitry configured to receive signals from the infrastructure equipment via the wireless access interface, and controller circuitry configured to transmit or receive signals via the wireless access interface to or from a peer terminal in the wireless communications network with one or more pre-authorised quality of service, PAQ, flows, at least one of the PAQ flows currently being inactive, and to transmit an indication to the wireless communications network that the communications device is preparing to transmit or receive data with the PAQ flows to or from the infrastructure equipment.

Paragraph 34. A method of controlling a communications device, the method comprising transmitting or receiving signals via a wireless access interface provided by a wireless communications network to or from a peer terminal in the wireless communications network with one or more pre-authorised quality of service, PAQ, flows, at least one of the PAQ flows currently being inactive, and transmitting an indication to the wireless communications network that the communications device is preparing to transmit or receive data with the PAQ flows to or from an infrastructure equipment forming part of the wireless communications network.

Paragraph 35. Circuitry for a communications device, comprising transmitter circuitry configured to transmit signals to an infrastructure equipment forming part of a wireless communications network via a wireless access interface provided by the wireless communications network, receiver circuitry configured to receive signals from the infrastructure equipment via the wireless access interface, and controller circuitry configured to transmit or receive signals via the wireless access interface to or from a peer terminal in the wireless communications network with one or more pre-authorised quality of service, PAQ, flows, at least one of the PAQ flows currently being inactive, and to transmit an indication to the wireless communications network that the communications device is preparing to transmit or receive data with the PAQ flows to or from the infrastructure equipment.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-160671, "New SID Proposal: Study on New Radio Access Technology," NTT DOCOMO, RAN #71.
[2] LTE for UMTS: OFDMA and SC-FDMA Based Radio Access, Harris Holma and Antti Toskala, Wiley 2009, ISBN 978-0-470-99401-6.
[3] 3GPP SA2 TR 23.799, "Technical Specification Group Services and System Aspects; Study on Architecture for Next Generation System (Release 14)," 3$^{rd}$ Generation Partnership Project.
[4] R2-168510, "Pre-authorised QoS in RAN," Intel Corporation, RAN #96.
[5] R2-167110, "DRB Establishment in Flow based QoS Concept," NTT DOCOMO.
[6] 3PGG TR 38.801, "Technical Specification Group Radio Access Network; Study on New Radio Access Technology; Radio Access Architecture and Interfaces (Release 14)," 3$^{rd}$ Generation Partnership Project.
[7] R2-1700659, "TP on QoS and new protocol layer," Ericsson.
[8] 3GPP TS 36.413, "Evolved Universal Terrestrial Radio Access Network (E-UTRAN); S1 Application Protocol (S1AP"," 3$^{rd}$ Generation Partnership Project.
[9] 3GPP TS 36.423, "Evolved Universal Terrestrial Radio Access Network (E-UTRAN); X2 Application Protocol (X2AP"," 3$^{rd}$ Generation Partnership Project.

What is claimed is:

1. A communications system, comprising:
one or more infrastructure equipment forming part of a wireless communications network, and
a communications device configured to transmit or receive signals via a wireless access interface provided by the wireless communications network to or from a peer terminal in the wireless communications network with one or more pre-authorized quality of service, PAQ, flows, at least one of the PAQ flows currently being inactive,
wherein one or more of the infrastructure equipment are configured to receive an indication that the communications device is preparing to transmit or receive data with the PAQ flows to or from the one or more of the infrastructure equipment,
wherein the infrastructure equipment is a first infrastructure equipment which is a target of a handover from a second infrastructure equipment, the second infrastructure equipment currently serving the communications device,
wherein the communications device is configured to receive a handover command from the second infrastructure equipment, the handover command comprising a backoff timer, wherein the setup of a new radio bearer for one or more of the PAQ flows is deferred until the backoff timer has elapsed.

2. The communications system according to claim 1, wherein when predetermined conditions are met, the infrastructure equipment is configured to set up a radio bearer to support at least one of the of the PAQ flows.

3. The communications system according to claim 2, wherein the predetermined conditions comprise at least one of the one or more PAQ flows becoming active.

4. The communications system according to claim 2, wherein one or more of the radio bearers are dedicated radio bearers which are specific to the PAQ flow they support.

5. The communications system according to claim 2, wherein one or more of the radio bearers are default radio bearers which are common to more than one of the PAQ flows.

6. The communications system according to claim 4, wherein the infrastructure equipment is configured to indicate to the communications device that one or more of the radio bearers are dedicated radio bearers and/or that the one or more of the radio bearers are default radio bearers.

7. The communications system according to claim 6, wherein the infrastructure equipment is configured to indicate to the communications device that the dedicated radio bearers and/or the default radio bearers are configured to support the PAQ flows.

8. The communications system according to claim 2, wherein one or more of the radio bearers has a guaranteed bit rate.

9. The communications system according to claim 2, wherein one or more of the radio bearers has a non-guaranteed bit rate.

10. The communications system according to claim 1, wherein the first infrastructure equipment is configured to receive the indication during an attachment process between the communications device and the wireless communications network.

11. The communications system according to claim 1, wherein the first infrastructure equipment is configured to receive the indication from the wireless communications network at a time when the PAQ flows are pre-authorized.

12. The communications system according to claim 1, wherein the first infrastructure equipment is configured to receive the indication from the wireless communications network at a time when the PAQ flows are modified.

13. The communications system according to claim 1, wherein the first infrastructure equipment is a next generation Node B, gNB, the gNB currently serving the communications device.

14. The communications system according to claim 1, wherein the first infrastructure equipment is a next generation Node B, gNB, and the second infrastructure equipment is a gNB.

15. The communications system according to claim 2, wherein, the first infrastructure equipment being configured to receive the indication from a second one of the infrastructure equipment.

16. The communications system according to claim 15, wherein the first infrastructure equipment is configured:
to receive signals from the second infrastructure equipment, the second infrastructure equipment currently serving the communications device, comprising signalling indicating that a handover procedure should be performed, the signalling comprising the indication that the communications device is preparing to transmit or receive data with the PAQ flows,
to determine that the first infrastructure equipment is able to serve the communications device with a selected one or more of the PAQ flows,
to transmit, as part of the handover procedure, an indication to the second infrastructure equipment that the first infrastructure equipment is able to serve the communications device with the selected PAQ flows, and
to receive, as part of the handover procedure, an indication from the second infrastructure equipment that the first infrastructure equipment should begin serving the communications device with the selected PAQ flows.

17. The communications system according to claim 1, wherein the infrastructure equipment is configured:

to transmit a paging message to the communications device, and to receive the indication that the communications device is preparing to transmit or receive data with the PAQ flows from the communications device in response to the paging message.

18. An infrastructure equipment forming part of a wireless communications network comprising:

transmitter circuitry configured to transmit signals to a communications device via a wireless access interface provided by the wireless communications network, receiver circuitry configured to receive signals from the communications device via the wireless access interface, and controller circuitry configured:

to receive an indication that the communications device is preparing to transmit or receive data with one or more pre-authorized quality of service, PAQ, flows to or from the infrastructure equipment, at least one of the PAQ flows currently being inactive, wherein the infrastructure equipment is a first infrastructure equipment which is a target of a handover from a second infrastructure equipment the second infrastructure equipment currently serving the communication device, wherein the communications device is configured to receive a handover command from the second infrastructure equipment, the handover command comprising a backoff timer, wherein the setup of a new radio bearer for one or more of the PAQ flows is deferred until the backoff timer has elapsed.

19. A communications device, comprising:

transmitter circuitry configured to transmit signals to an infrastructure equipment forming part of a wireless communications network via a wireless access interface provided by the wireless communications network, receiver circuitry configured to receive signals from the infrastructure equipment via the wireless access interface, and controller circuitry configured:

to transmit or receive signals via the wireless access interface to or from a peer terminal in the wireless communications network with one or more pre-authorized quality of service, PAQ, flows, at least one of the PAQ flows currently being inactive, and to transmit an indication to the wireless communications network that the communications device is preparing to transmit or receive data with the PAQ flows to or from the infrastructure equipment, wherein the infrastructure equipment is a first infrastructure equipment which is a target of a handover from a second infrastructure equipment, the second infrastructure equipment currently serving the communication device, wherein the communications device is configured to receive a handover command from the second infrastructure equipment, the handover command comprising a backoff timer, wherein the setup of a new radio bearer for one or more of the PAQ flows is deferred until the backoff timer has elapsed.

* * * * *